United States Patent
Götzinger et al.

(10) Patent No.: US 10,987,773 B2
(45) Date of Patent: Apr. 27, 2021

(54) TRANSPORT DEVICE FOR ROTATABLY AND/OR LINEARLY MOVING A WORKPIECE

(71) Applicant: WEISS GMBH, Buchen (DE)

(72) Inventors: Martin Götzinger, Buchen (DE); Uwe Simon, Buchen (DE)

(73) Assignee: WEISS GmbH

( * ) Notice: Subject to any disclaimer, the term of this patent is extended or adjusted under 35 U.S.C. 154(b) by 0 days.

(21) Appl. No.: 16/632,049

(22) PCT Filed: Jul. 10, 2018

(86) PCT No.: PCT/EP2018/068703
§ 371 (c)(1),
(2) Date: Jan. 17, 2020

(87) PCT Pub. No.: WO2019/016038
PCT Pub. Date: Jan. 24, 2019

(65) Prior Publication Data
US 2020/0230763 A1 Jul. 23, 2020

(30) Foreign Application Priority Data
Jul. 20, 2017 (DE) ...................... 10 2017 116 414.6

(51) Int. Cl.
*B23Q 7/02* (2006.01)
*B23Q 1/52* (2006.01)
(Continued)

(52) U.S. Cl.
CPC ................. *B23Q 7/02* (2013.01); *B23Q 1/52* (2013.01); *B23Q 16/021* (2013.01);
(Continued)

(58) Field of Classification Search
CPC .......... B23Q 7/02; B23Q 1/52; B23Q 16/021; B23Q 16/102; B23Q 2210/004; B23Q 2220/004
See application file for complete search history.

(56) References Cited

U.S. PATENT DOCUMENTS 3,682,005 A * 8/1972 Fantz .................... F16H 25/122
74/58
3,850,051 A * 11/1974 Woltjen ................. B23Q 1/287
74/821
(Continued)

FOREIGN PATENT DOCUMENTS

DE 102007021681 B3 * 9/2008 .......... B23Q 16/025
DE 102009049618 A1 4/2011
(Continued)

*Primary Examiner* — Vicky A Johnson
(74) *Attorney, Agent, or Firm* — Dickinson Wright PLLC

(57) ABSTRACT

The invention relates to a transport device comprising a transport element for receiving a workpiece, said transport element being movable by means of a motor from a first idle position into a second idle position, the transport element being drivably connected to at least one driver that engages in a drive groove of a drum cam that can be driven by the motor, which can be controlled by means of a programmable control device on the basis of a motor control curve. The drive groove has a variable incline at least in sections and the motor control curve also has a variable course at least in sections, the movement of the transport element being generated by a simultaneous superposition of a first movement component based on a region of variable incline of the drive nut and a second movement component based on a variable region of the motor control curve.

11 Claims, 2 Drawing Sheets

(51) Int. Cl.
 *B23Q 16/02* (2006.01)
 *B23Q 16/10* (2006.01)
(52) U.S. Cl.
 CPC ...... *B23Q 16/102* (2013.01); *B23Q 2210/004* (2013.01); *B23Q 2220/004* (2013.01)

(56) References Cited

U.S. PATENT DOCUMENTS

| | | | | |
|---|---|---|---|---|
| 4,704,152 A * | 11/1987 | Davey | ...................... | C03B 11/16 65/68 |
| 8,443,698 B2 * | 5/2013 | Cafuta | ................. | B23Q 16/025 74/813 R |
| 8,720,289 B2 * | 5/2014 | Howard | ................ | F16H 25/122 74/56 |
| 2012/0255397 A1 * | 10/2012 | Weiss | ..................... | B23Q 1/522 74/813 R |

FOREIGN PATENT DOCUMENTS

| | | | |
|---|---|---|---|
| DE | 102010018003 A1 | 10/2011 | |
| DE | 102015013651 A1 | 4/2017 | |
| EP | 2093642 A1 | 8/2009 | |
| WO | WO-2017067628 A1 * | 4/2017 | ........... B23Q 16/025 |

\* cited by examiner

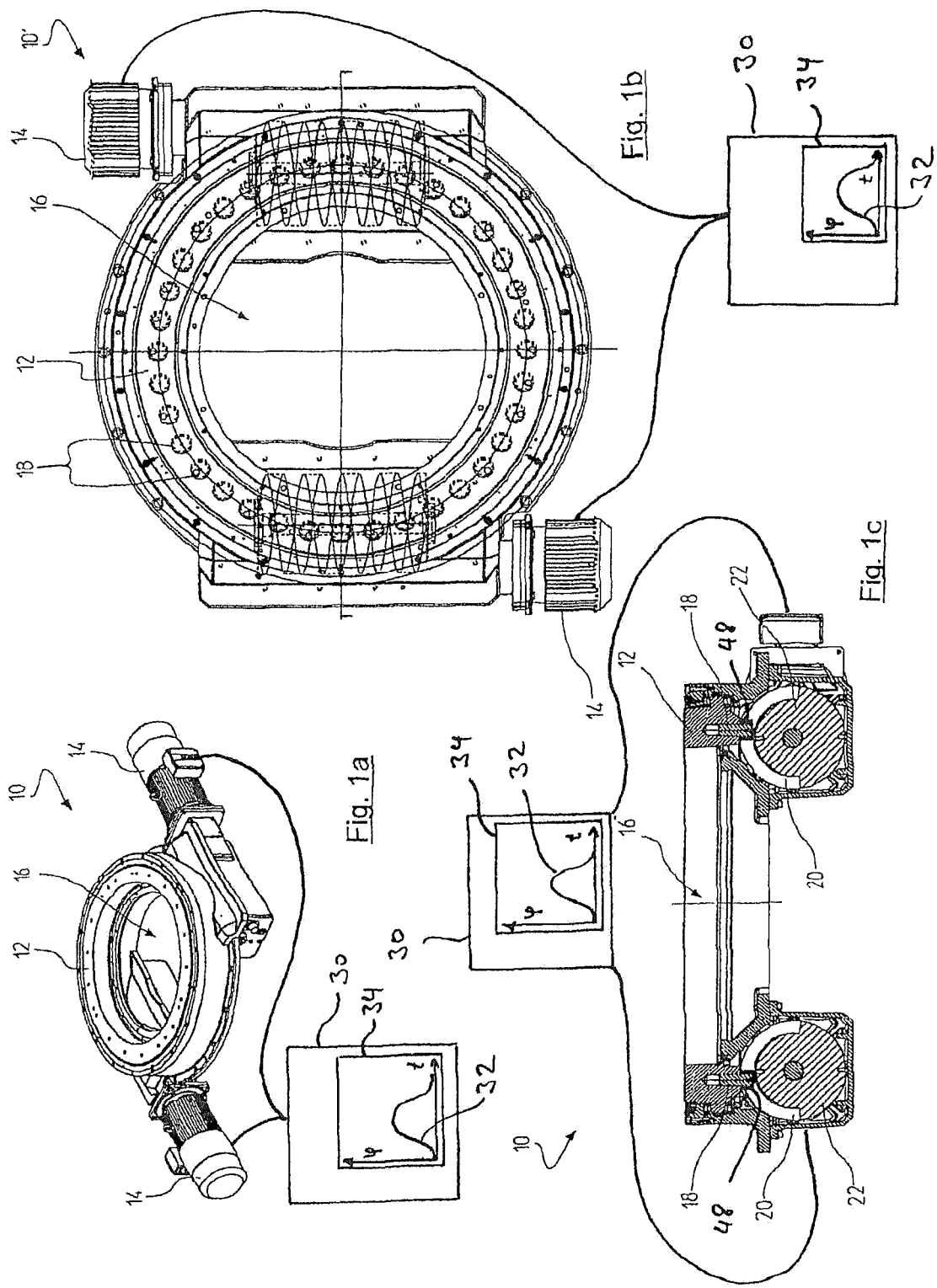

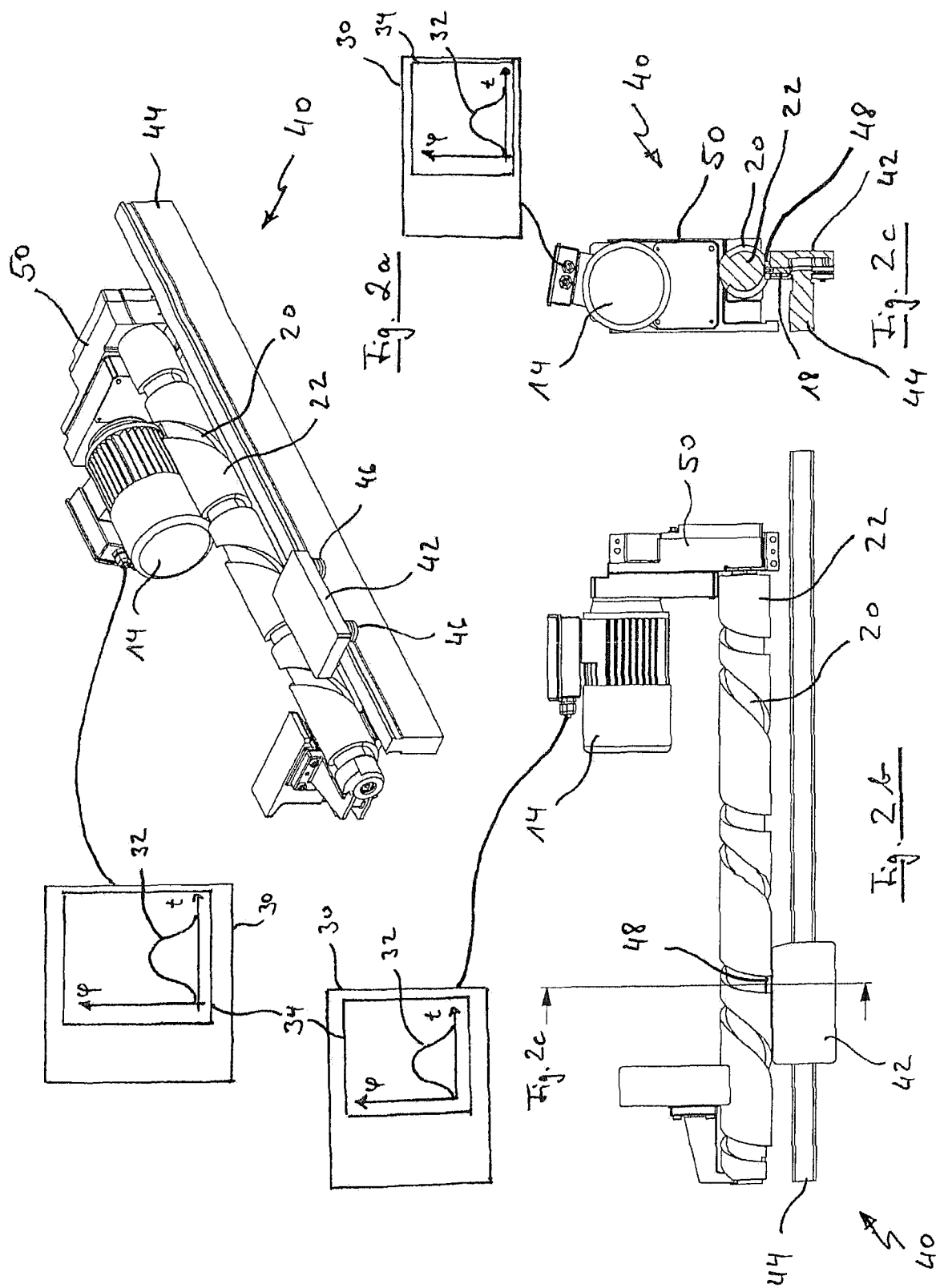

TRANSPORT DEVICE FOR ROTATABLY AND/OR LINEARLY MOVING A WORKPIECE

CROSS-REFERENCES TO RELATED APPLICATIONS

This patent application is a 371 of International Application No. PCT/EP2018/068703, filed Jul. 10, 2018 which claims the priority of German Application No. 102017116414.6, filed Jul. 20, 2017, each of which are incorporated herein by reference in their entirety.

The present invention relates to a transport apparatus for a rotary and/or linear movement of a workpiece comprising a transport element that is suitable for receiving the workpiece and that is movable in a rotary and/or linear manner by means of a motor from a first position of rest into a second position of rest.

The most varied apparatus can be used to move a workpiece. A transport belt or a gripper travelable by a linear motor are, for example, suitable for generating a linear or translatory movement. Workpiece carriers can preferably be subjected to a linear transport movement by means of a linear assembly system. So-called rotary indexing tables are often used if the workpiece is to be set into a rotary movement. Such rotary indexing tables are generally known in different embodiments from the prior art. They, for example, serve to transport workpieces arranged on an output flange configured as a turntable from a processing or assembly station to a next processing or assembly station in each case by a rotation of the output flange. This transport can take place as part of a cyclic operation in which the turntable is rotated by a specific angular dimension in each cycle.

The observation of small tolerances or the precision is frequently of importance both on a linear transport movement and on a rotary transport movement. In other words, the workpiece should be moved reliably and precisely from the first position of rest into a predetermined second position of rest. In a number of cases it is here not only necessary that the second position of rest is exactly adopted, but also that a movement profile of the workpiece between the two positions of rest must also obey predefined constraints such as predefined speeds or predefined accelerations.

It can furthermore be added as a further demand that the transport should take place in as energy saving a manner as possible. The transport apparatus used should here consume as little energy as possible while maintaining the customary performance capability and with the same precision where possible. Certain savings potential—for example by reducing the friction between the individual components—are admittedly present; however, design changes are frequently associated with higher manufacturing and/or servicing costs so that optimizations in this area quickly reach economic limits.

It is therefore the object of the invention to provide a transport apparatus for a rotary and/or linear movement of a workpiece from a first position of rest into a second position of rest that enables an operation that is as efficient as possible without substantial compromises having to be accepted in the precision or dynamics of the transport movement.

This object is satisfied by a transport apparatus having the features of claim 1 for moving a workpiece from a first position of rest into a second position of rest and in particular in that the mechanical control cam of the barrel cam, that is configured as a drive groove, for example, at least regionally has a variable pitch, i.e. a non-constant pitch, and in that the motor control cam or motor control curve likewise at least regionally has a variable or time-variable pitch, with the movement of the transport element resulting from a simultaneous superposition of a first movement component that is based on a region of variable pitch of the drive groove or on the mechanical control cam and of a second movement component that is based on a region of variable pitch of the motor control cam. The motor control cam here specifies an angle of rotation $\varphi$ of the motor dependent on the time to achieve a desired movement profile of the transport element so that the current supplied to the motor can be regulated on the basis of the motor control cam.

In accordance with the invention, a transport apparatus is thus proposed for the first time in which the movement profile of the workpiece to be transported or of the transport element is stored, on the one hand, as in a conventional fixedly cycling system in a variable mechanical control cam and, on the other hand as in a conventional freely programmable system in a time-variable or variable motor control cam, with the movement components that result, on the one hand, from the mechanical control cam and, on the other hand, from the motor control cam, being coordinated with one another at all times such that the transport element follows a predefined or desired movement profile.

If, for example, therefore a predefined movement profile of the workpiece between the two positions of rest is the starting point for a specific transport task, the mechanical control cam, on the one hand, and the motor control cam, on the other hand, can be optimized such that the predefined movement profile is observed as exactly as possible. It is equally possible for the achieving of a desired movement profile of the workpiece between the two positions of rest, for example, to specify a mechanical control cam selected as desired within the framework of certain limits and to adapt the motor control cam accordingly so that the desired movement profile is produced by superposing the two movement components that result, on the one hand, from the mechanical control cam and, on the other hand, from the motor control cam.

In addition, the motor control cam can be optimized on the basis of the dynamics of the respective motor such that the motor can also be operated close to its optimum operating point or close to its optimum torque range. A considerable energy saving effect can hereby be achieved with respect to conventional systems, whereby as a result a less powerful motor can be used with respect to conventional systems for one and the same transport task. Furthermore, the maximum jerk value of the movement profile of the workpiece can be kept small by adaptation of the motor control cam and/or of the mechanical control cam of the barrel cam.

Preferred embodiments of the invention will now be looked at in the following. Further embodiments can result from the dependent claims, from the description of the Figures and from the drawings.

Provision can thus be made in accordance with an embodiment that the motor can be controlled on the basis of a region of variable pitch of the motor control cam during a time window in which the at least one entrainer is located in a region of variable pitch of the mechanical control cam. In other words, the at least one entrainer can be in a region of variable pitch of the mechanical control cam during a time window in which a region of variable pitch of the motor control cam is active to control the motor.

In accordance with a further embodiment, the mechanical control cam does not have a rest passage, i.e. a region having zero pitch, either at a position corresponding to the first position of rest or at a position corresponding to a second position of rest and also not therebetween. In conventionally cycling systems, such rest passages are in contrast required to accelerate the motor to its rated speed. In contrast to this, in accordance with the invention, such rest passage phases can be omitted since the acceleration of the motor or the movement component that results here from is superposed by the movement component that results from the mechanical control cam such that the resulting movement profile of the workpiece corresponds to a predefined movement profile. Since the mechanical control cam does not have any rest passage, the cycle time can be shortened with respect to conventional cycling systems with the same motor size without increasing mechanical strains.

It can admittedly be sufficient for the achievement of the previously described advantageous effects for the mechanical control cam and the motor control cam each to have one or more regions where they are variable or not constant; in accordance with a preferred embodiment, provision can, however, be made that the pitch of the mechanical control cam is continuously variable between a position of the motor control cam corresponding to the first position of rest of the and a position of the motor control cam corresponding to the second position of rest and in particular does not have any regions of constant pitch. In a corresponding manner, the motor control cam, and in particular its pitch, can be continuously variable and cannot have any constant cam region between a position corresponding to the first position of rest and a position corresponding to the second position of rest. This makes possible an optimization of the mechanical control cam and of the motor control cam over the total movement profile of the workpiece between the two positions of rest, whereby the energy consumption of the transport apparatus can be minimized in the desired manner.

In accordance with a preferred embodiment, the transport element can be a workpiece carrier of a linear assembly system that is movably guided along a rail of the linear assembly system.

In accordance with a different embodiment, the transport element can be an output flange of a rotary indexing table configured as a turntable.

The invention will now be explained in the following purely by way of example with reference to the drawings, in which:

FIGS. 1a-1c show an embodiment of a transport apparatus configured as a rotary indexing table in different views; and FIGS. 2a-2c show an embodiment of a transport apparatus configured as a linear transport system in different views.

FIG. 1a perspectively shows a rotary indexing table 10 that in the embodiment specifically shown here has an annular output flange 12 or turntable 12 that is driven to make a rotary movement by two motors 14. Instead of driving the output flange 12 by means of two motors 14 in accordance with the embodiment shown here, the output flange 12 can also be driven in a manner known per se via only one single motor or via more than two motors. In the embodiment shown here, the output flange 12 is annular and surrounds a central opening 16 in which, for example, one or more machining tools can be located to machine workpieces fastened to the turntable 12.

FIG. 1b substantially shows the embodiment of FIG. 1a in a plan view, with entrainers 18 being able to be recognized that are drawn as dashed, that can, for example, be configured as roller pins, and that are drive-effectively connected to the side of the output flange 12—its lower side in the position of use. Only the motors 14 have different dimensions than the motors 14 shown in FIG. 1a.

As can be seen in FIG. 1c, the entrainers 18, and in particular the cam rollers 48 rotatably supported thereon, engage into drive grooves 20 that are formed in barrel cams 22 driven to make a rotary movement by the two motors 14. The entrainers 18 that engage into the drive grooves 20 running spirally around the barrel cams 22 are dragged along by the rotary movements of the barrel cams 22, whereby the turntable 12 is driven to make a rotary movement. The drive grooves 20 thus form a mechanical control cam since inter alia the movement profile of the turntable 12 is determined by its pitch.

The motors 14 and the barrel cams 22 can generally be arranged coaxially. In the present embodiment, however, a transmission (not shown) is interposed to step down a drive speed of the motors 14 (indirect drive). Although different kinds of motors can be used, the use of synchronous motors is provided in accordance with a preferred embodiment. The two motors 14 are connected in parallel for this purpose and are supplied with power by a common control apparatus 30 on the basis of a motor control cam 32 that can be stored in a programmable memory 34 of the control apparatus 30.

As can be seen from FIGS. 1a to 1c, the motor control cam 32 can specify an angle of rotation $\varphi$ of each motor 14, with the angle of rotation $\varphi$ continuously changing in dependence on time; the motor control cam 32 can, for example, have an angle of rotation progression varying in the manner of a bell curve. The motor control cam 32 here depends on time and specifies the angle of rotation $\varphi$ of the motor 14 that is required so that the output flange 12 covers a specific distance or angle in dependence on time. The drive grooves 20 that are formed in the barrel cams 22 furthermore have a variable, i.e. non-constant, pitch even if this cannot be exactly recognized here, in particular not in FIG. 1b.

The current feed to the motors 14 takes place here on the basis of the motor control cam 32 in that the actual angle of rotation of the respective motor 14 is detected by means of a rotary encoder (not shown) and is compared with the time-dependent desired angle of rotation $\varphi$ in accordance with the motor control cam 32 so that the current supplied to the motor 14 can be regulated by the control apparatus 30 on the basis of this comparison. If the output flange 12 is now driven by means of the two motors 14 via the respective barrel cams 22 on the basis of the motor control cam 32 stored in the memory 34 of the control cam 30, the rotary movement of the output flange 12 is thus composed of two movement components that simultaneously superpose one another: one movement component of the output flange 12 is thus based on the pitch of the rotating drive groove 20 and a second movement component is based on the current feed of the motors 14 varying on the basis of the motor control cam 32.

Since both the pitch of the drive grooves 20 is at least regionally variable and the motor control cam 32 at least regionally has a variable pitch, a desired movement profile of the output flange 12 can be achieved, that can be as complex as desired, by a simultaneous superposition of the movement component that is based on a region of variable pitch of the drive grooves 20 and of the movement component that is based on a region of variable pitch of the motor control cam 32. An optimization of the movement profile of the output flange 12 can, for example, be achieved in this manner with a preselected profile or pitch progression of the output grooves 20 by a variation of the motor control cam 32.

In the embodiment in accordance with FIGS. 2a to 2c, it is a linear transport system 40 for use in a linear assembly system, for example. The linear transport system 40 shown has a workpiece carrier 42 as the transport element that is supported by means of rollers 46 on a rail 44 so that the workpiece carrier 42 can be traveled, guided by the rail 44, along the same to different assembly stations that are arranged along the linear transport system 40 or the rail 44. If the individual assembly stations are further remote from one another, the workpiece carriers 42 can be traveled at high speed between the individual assembly stations by means of a linear motor arrangement (not shown).

In the embodiment shown here, the drive of the workpiece carrier 42 in the region of the assembly station takes place at high precision via a control cam 22 that extends along the rail 44 and that is driven by a motor 14 via a transmission 50. The rotary movement of the barrel cam 22 is here converted into a longitudinal movement of the workpiece carrier 42 in that an entrainer 18 provided laterally at the workpiece carrier 42, and in particular its cam roller 48, engages in a drive groove 20 that is formed in the barrel cam 22 and that spirally surrounds it. The entrainer 18 that engages into the drive groove 20 spirally surrounding the barrel cam is thus dragged along by the rotary movement of the barrel cam 22, whereby the workpiece carrier 42 is traveled along the rail 44. As can here in particular be seen from FIG. 2b, the drive groove 20 has a pitch that continuously changes over the total length of the barrel cam 22.

The current feed of the motor 14 also here again takes place by means of a control apparatus 30 on the basis of a motor control cam 32 that is stored in a programmable memory 34 of the control apparatus 30. The motor control cam 32 here depends on time and specifies the angle of rotation φ of the motor 14 that is required so that the workpiece carrier 42 covers a specific distance or stroke in dependence on time. The current feed to the motor 14 takes place here on the basis of the motor control cam 32 in that the actual angle of rotation of the motor 14 is detected by means of a rotary encoder (not shown) and is compared with the time-dependent desired angle of rotation φ in accordance with the motor control cam 32 so that the current supplied to the motor 14 can be regulated by the control apparatus 30 on the basis of this comparison.

The pitch of the motor control cam 32 is here admittedly variable over its total time progression and in particular has an extent of an angle of rotation that varies in the manner of a bell curve; the motor control cam 32 can, however, also only have a variable pitch regionally if the pitch of the drive groove 20 also simultaneously changes.

A desired movement profile of the workpiece carrier 42 that can be as complex as desired can thus here also be achieved by a simultaneous superposition of a movement component that is based on a region of variable pitch of the drive groove 20 and of the movement component that is based on a region of variable pitch of the motor control cam 32.

REFERENCE NUMERAL LIST 10 rotary indexing table
12 turntable or output flange
14 motor
16 opening
18 entrainer
20 drive groove
22 barrel cam
30 control apparatus
32 motor control cam
34 memory
40 linear transport system
42 workpiece carrier
44 rail
46 roller
48 cam roller
50 transmission

The invention claimed is:

1. A transport apparatus having a transport element that is suitable for receiving a workpiece and that is movable at least one of rotationally and linearly by means of a motor from a first position of rest into a second position of rest, wherein the transport element is drive-effectively connected to at least one entrainer that engages into a drive groove of a barrel cam that can be driven by the motor that is controllable by means of a programmable control apparatus on the basis of a motor control curve, wherein the drive groove has a variable pitch at least regionally; and wherein the motor control curve likewise has a variable pitch at least regionally, with the movement of the transport element resulting from a simultaneous superposition of a first movement component that is based on a region of variable pitch of the drive groove and of a second movement component that is based on a variable pitch region of the motor control curve.

2. The transport apparatus in accordance with claim 1, wherein the motor is controllable on the basis of a region of variable pitch of the motor control curve, while the at least one entrainer is located in a region of variable pitch of the drive groove.

3. The transport apparatus in accordance with claim 1, wherein the at least one entrainer is located in a region of variable pitch of the drive groove, while a region of variable pitch of the motor control curve is active to control the motor.

4. The transport apparatus in accordance with claim 1, wherein the motor control curve specifies an angle of rotation of the motor for achieving a desired movement profile of the transport element.

5. The transport apparatus in accordance with claim 1, wherein the drive groove does not have a rest passage either at a position corresponding to the first position of rest or at a position corresponding to the second position of rest and also not therebetween.

6. The transport apparatus in accordance with claim 1, wherein the pitch of the drive groove is variable between a position of the drive groove corresponding to the first position or rest and a position of the drive groove corresponding to the second position of rest.

7. The transport apparatus in accordance with claim 6, wherein the pitch of the drive groove does not have any regions of constant pitch.

8. The transport apparatus in accordance with claim 1, wherein the motor control curve is variable between a position corresponding to the first position of rest and a position corresponding to the second position of rest.

9. The transport apparatus in accordance with claim 8, wherein the motor control curve does not have any curve regions of constant pitch.

10. The transport apparatus in accordance with claim 1, wherein the transport element is a workpiece carrier of a linear transport system that is guided along a rail of the linear transport system.

11. The transport apparatus in accordance with claim 1, wherein the transport element is a turntable of a rotary indexing table.

\* \* \* \* \*